(12) United States Patent
Kusumoto

(10) Patent No.: US 11,306,618 B2
(45) Date of Patent: Apr. 19, 2022

(54) SHROUD ATTACHING STRUCTURE, SHROUD ASSEMBLY, AND SHROUD ELEMENT IN GAS TURBINE

(71) Applicant: KAWASAKI JUKOGYO KABUSHIKI KAISHA, Kobe (JP)

(72) Inventor: Yoshiaki Kusumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/012,096

(22) Filed: Sep. 4, 2020

(65) Prior Publication Data
US 2020/0400040 A1 Dec. 24, 2020

Related U.S. Application Data

(63) Continuation of application No. PCT/JP2018/008781, filed on Mar. 7, 2018.

(51) Int. Cl.
*F01D 11/08* (2006.01)
*F01D 25/24* (2006.01)
*F01D 11/00* (2006.01)

(52) U.S. Cl.
CPC ............ *F01D 25/246* (2013.01); *F01D 11/08* (2013.01); *F01D 11/005* (2013.01); *F05D 2220/323* (2013.01); *F05D 2240/11* (2013.01); *F05D 2260/30* (2013.01); *F05D 2300/6033* (2013.01)

(58) Field of Classification Search
CPC ........ F01D 11/005; F01D 11/08; F01D 25/24; F01D 25/246; F01D 9/04; F05D 2300/6033; F05D 2240/11
See application file for complete search history.

(56) References Cited

U.S. PATENT DOCUMENTS

| 5,685,693 A | 11/1997 | Sexton et al. |
| 8,568,091 B2* | 10/2013 | McCaffrey ............ F01D 11/125 415/173.3 |
| 9,080,458 B2* | 7/2015 | Romanov ............... F01D 11/24 |
| 2003/0071423 A1 | 4/2003 | Urlichs |
| 2005/0111965 A1 | 5/2005 | Lowe et al. |

(Continued)

FOREIGN PATENT DOCUMENTS

| JP | H09-4411 A | 1/1997 |
| JP | 2002-242612 A | 8/2002 |

(Continued)

OTHER PUBLICATIONS

Extended European Search Report dated Sep. 17, 2021, in corresponding European Patent Application No. 18908925.3, 12 pp.

*Primary Examiner* — David E Sosnowski
*Assistant Examiner* — Maxime M Adjagbe
(74) *Attorney, Agent, or Firm* — Xsensus LLP

(57) ABSTRACT

A shroud attaching structure of a gas turbine includes: a support provided around an axis of the gas turbine and inside a casing of the gas turbine in a radial direction; and a shroud assembly attached to the support so as to cover an inner peripheral surface of the support, the shroud assembly being formed by laminating a large number of plate-shaped shroud elements containing a ceramic matrix composite. The shroud elements are lined up in a circumferential direction of the support. The adjacent shroud elements are arranged so as to be slidable on each other.

19 Claims, 8 Drawing Sheets

(56) References Cited

U.S. PATENT DOCUMENTS

| | | |
|---|---|---|
| 2008/0107521 A1 | 5/2008 | Morrison et al. |
| 2009/0053050 A1 | 2/2009 | Bruce et al. |
| 2010/0150703 A1 | 6/2010 | Gonzalez et al. |
| 2010/0172754 A1 | 7/2010 | Flanagan |
| 2010/0247298 A1 | 9/2010 | Nakamura et al. |
| 2016/0146053 A1* | 5/2016 | McCaffrey .............. F01D 25/24 |
| | | 415/173.1 |
| 2016/0208633 A1 | 7/2016 | Hafner et al. |
| 2016/0348521 A1* | 12/2016 | Sippel ..................... F01D 5/225 |
| 2017/0268372 A1* | 9/2017 | McCaffrey ............ F01D 25/246 |
| 2018/0080343 A1* | 3/2018 | Groleau .................. F01D 11/08 |

FOREIGN PATENT DOCUMENTS

| | | |
|---|---|---|
| JP | 2004-500526 A | 1/2004 |
| JP | 2005-155626 A | 6/2005 |
| JP | 2009-052553 A | 3/2009 |
| JP | 2010-159755 A | 7/2010 |
| JP | 2010-229925 A | 10/2010 |
| JP | 2016-133117 A | 7/2016 |
| WO | WO2016146942 A1 * | 9/2016 |

* cited by examiner

UPSTREAM SIDE ←— AXIAL DIRECTION —→ DOWNSTREAM SIDE

SHROUD ATTACHING STRUCTURE, SHROUD ASSEMBLY, AND SHROUD ELEMENT IN GAS TURBINE

CROSS-REFERENCE TO RELATED APPLICATION

The present application is a bypass continuation of PCT filing PCT/JP2018/008781, filed Mar. 7, 2018, the entire contents of which are incorporated herein by reference.

TECHNICAL FIELD

The present disclosure relates to a shroud attaching structure, shroud assembly, and shroud element in a turbine.

BACKGROUND ART

A functional part or structure arranged at an outer peripheral portion of a moving blade of a turbo machine, such as a gas turbine, and configured to properly keep a gap at a tip end of the moving blade is typically called a shroud. In the gas turbine, the shroud at a turbine upstream stage is required to have very high heat resistance. Proposed as one of solutions to this is the use of a ceramic matrix composite (CMC) having higher heat resistance than metal materials.

CITATION LIST

Patent Literature

PTL 1: Japanese Laid-Open Patent Application Publication No. 2016-133117
PTL 2: Japanese Laid-Open Patent Application Publication No. 2009-52553

SUMMARY

Technical Problem

However, there is a problem that: since the shroud needs to be formed in an annular shape along an inner peripheral surface of a casing, and an attaching portion attached to a support or the like needs to be formed, the shroud has to be formed in a complex three-dimensional shape; but according to the ceramic matrix composite having a long fiber shape, it is difficult to form a thick complex shape while maintaining the original strength of the material. Moreover, when a crack is generated at the shroud due to some abnormality, the crack may spread in a wide range of the shroud with the lapse of time.

Solution to Problem

A shroud attaching structure of a gas turbine according to an exemplary embodiment includes: a support provided around an axis of the gas turbine and inside a casing of the gas turbine in a radial direction; and a shroud assembly attached to the support so as to cover an inner peripheral surface of the support, the shroud assembly being formed by laminating a large number of plate-shaped shroud elements containing a ceramic matrix composite. The shroud elements are laminated so as to be lined up in a circumferential direction of the support. The adjacent shroud elements are arranged so as to be slidable on each other.

According to the above configuration, the shroud assembly is formed by laminating the plate-shaped shroud elements such that the thickness direction of the shroud element corresponds to the circumferential direction of the support. Therefore, each of the shroud elements has a simple plate shape and can be easily produced. Especially, it is difficult for the ceramic matrix composite having a long fiber shape to form a thick three-dimensional shape. However, according to the above configuration, the shroud element can be formed in a thin plate shape. Therefore, the shroud can be easily produced by the ceramic matrix composite. The shroud assembly is divided into a large number of shroud elements. Therefore, even if a crack is generated on one shroud element due to some abnormality, the crack of the shroud element is prevented from spreading to the adjacent shroud elements. Thus, the function of the shroud can be maintained even after the generation of the crack. In addition, since the shroud elements laminated on each other in the circumferential direction are slidable on each other, the shape of the shroud assembly can be flexibly changed. Therefore, excessive stress is prevented from being applied to the shroud elements. Moreover, for example, even when the support (casing) moves, or even when relative size changes of the shroud elements and peripheral members occur by the thermal expansion difference between the shroud elements and the peripheral members, the shroud elements can follow such movement or such size changes.

The shroud elements may be laminated in the circumferential direction such that thickness directions of the shroud elements are inclined relative to the axial direction.

According to the above configuration, since the shroud elements are inclined relative to the axial direction, a circumferential length of the shroud assembly can be adjusted.

The shroud elements may be attached to the support so as to be tiltable in a direction inclined relative to at least one of the axial direction and the radial direction.

According to the above configuration, when the adjacent shroud elements slide on each other, and each of the shroud element tilts so as to be inclined relative to at least one of the axial direction and the radial direction, the circumferential length and diameter of the shroud assembly can be dynamically changed. Therefore, even when the support (casing) moves, or even when relative size changes of the shroud elements and peripheral members occur by the thermal expansion difference between the shroud elements and peripheral members, the shroud elements can freely absorb such movement or such size changes.

The support may include an end surface supporting downstream portions of the shroud elements from a downstream side.

According to the above configuration, the downstream portion of the shroud element is naturally pushed toward the end surface of the support by the pressure of the high-pressure gas at the upstream side of the turbine, and this generates a load which increases the inclination angles of the shroud elements in the axial direction. Therefore, even when the laminated state of the shroud assembly is disordered during the driving of the turbine, there is an effect in which the inclination angles of the shroud elements in the axial direction naturally recover, i.e., try to become maximum.

Each of the shroud elements may include: a plate-shaped main body portion arranged inside the support in the radial direction; and at least one engaging portion provided at a side of the main body portion which side is opposed to the support, the at least one engaging portion being engaged with at least one engaged portion of the support.

According to the above configuration, the shroud elements can be easily attached to the support.

The at least one engaged portion may include a pair of engaged portions located away from each other in the axial direction. The at least one engaging portion may include a pair of engaging portions located away from each other in the axial direction. A distance between the pair of engaging portions may be longer than a distance between the pair of engaged portions.

According to the above configuration, the shroud elements can freely tilt relative to the axial direction, and the tilting structure of the shroud elements can be provided by a simple configuration.

One of the pair of engaging portions may include an axial positioning end surface facing a downstream side of the gas turbine. One of the pair of engaged portions may include an axial positioning end surface facing an upstream side of the gas turbine.

According to the above configuration, even if the shroud element breaks, a fragment including the engaging portion can be made to hardly flow toward a mainstream side.

Each of the pairs of engaging portions may include: a root portion projecting from the main body portion outward in the radial direction; and a claw portion projecting from a tip end side of the root portion in the axial direction.

According to the above configuration, the process of assembling the shroud elements to the support can be facilitated by a simple configuration.

The shroud attaching structure may further include a preload mechanism configured to apply a preload to the shroud assembly in the axial direction. The preload mechanism may apply the preload to the shroud assembly in a direction toward axial positioning surfaces of the shroud elements, the direction being such a direction that inclinations of the shroud elements relative to the axial direction increase.

According to the above configuration, when the shroud elements are arranged so as to be inclined, the preload of inclining the shroud elements acts in advance between the preload mechanism and the engaged portion of the support. Therefore, even when the gas pressure of the turbine changes, the shroud elements can be made to smoothly tilt in accordance with the displacement of the support blocks. Moreover, even when the gas pressure in the turbine is low, the engagement of a large number of laminated shroud elements with the support can be suitably maintained.

The preload mechanism may include a contact member including positioning grooves lined up in the circumferential direction, the positioning grooves positioning axial-direction end portions of the shroud elements.

According to the above configuration, when the shroud elements tilt, the inclination angles of the shroud elements can be prevented from varying in the entire shroud assembly.

The support may include a plurality of support blocks which are lined up in the circumferential direction so as to be displaceable in the radial direction of the support.

According to the above configuration, when the support blocks are displaced in the radial direction by so-called active clearance control, and this makes the shroud assembly displaced in the radial direction, a tip clearance between a moving blade of the turbine and the shroud assembly can be adjusted. Then, when the shroud assembly is displaced in the radial direction in accordance with the displacement of the support blocks in the radial direction, the adjacent shroud elements slide on each other, and the shroud elements tilt relative to the axial direction. With this configuration, the circumferential length of the shroud assembly changes, and the shroud assembly can smoothly follow the change in the diameter of the support.

Circumferential-direction end surfaces of the plurality of support blocks may be inclined relative to the radial direction.

According to the above configuration, the shroud element can be prevented from being unexpectedly hooked to a gap between the adjacent support blocks.

The main body portion and the engaging portion may be formed on the same plane. Each of the shroud elements may be a thin plate formed such that a thickness of the shroud element in the circumferential direction is smaller than a size of the main body portion in the radial direction.

According to the above configuration, the shroud element is formed in a thin and simple two-dimensional shape, and therefore, the productivity improves.

A groove extending from an outside to an inside in the radial direction may be formed on a main surface of the main body portion which surface faces in the circumferential direction.

According to the above configuration, when the shroud assembly is formed by laminating the shroud elements, the grooves on the main surfaces of the shroud elements can serve as cooling holes through which a radially outer side and radially inner side of the shroud assembly communicate with each other.

The shroud attaching structure may further include a ring-shaped cover arranged concentrically with the shroud assembly in an annular cooling gas space formed between the support and the shroud assembly. The cover may include a through hole.

According to the above configuration, since the cooling gas from the cooling gas space is introduced through the through hole of the cover toward the shroud elements, the cooling gas can be prevented by the cover from leaking through an unintended position.

The shroud attaching structure may further include a positioning member configured to determine a relative positional relation among the plurality of shroud elements in the circumferential direction.

According to the above configuration, when the shroud elements tilt, the inclination angles of the shroud elements can be prevented from varying in the entire shroud assembly.

The shroud elements may change in thickness in the radial direction.

According to the above configuration, even when lamination angles of the shroud elements change, changes in contact positions of the shroud elements are suppressed. Thus, sliding resistance can be stabilized, and slide amounts of the shroud elements lined up in the circumferential direction can be prevented from varying. Moreover, when a thick portion of the shroud element that changes in thickness in the radial direction is provided at not the engaging portion but the main body portion, a shearing load generated at the engaging portion can be suppressed. Furthermore, when the thick portion of the shroud element that changes in thickness in the radial direction is provided to extend entirely in the longitudinal direction of the shroud element, the adjacent shroud elements stably contact each other at the thick portions entirely in the longitudinal direction. On this account, for example, when introducing the cooling gas from the radially outer side, a seal effect of preventing the cooling gas from passing through between the adjacent shroud elements is achieved. Thus, the cooling gas is easily controlled.

A shroud assembly of a gas turbine according to an exemplary embodiment is a shroud assembly attached to a support provided at an inner peripheral surface side of a casing of a gas turbine. The shroud assembly includes a large number of plate-shaped shroud elements containing a ceramic matrix composite, the plate-shaped shroud elements being laminated so as to be lined up in a circumferential direction of the support, the adjacent shroud elements being arranged so as to be slidable on each other.

Shroud elements of a gas turbine according to an exemplary embodiment constitute a shroud assembly attached to a support provided at an inner peripheral surface side of a casing of the gas turbine engine, the adjacent shroud elements being arranged so as to be slidable on each other. The shroud elements contain a ceramic matrix composite. Each of the shroud elements include: a plate-shaped main body portion arranged inside the support in the radial direction; and at least one engaging portion provided at a side of the main body portion which side is opposed to the support, the at least one engaging portion being engaged with an engaged portion of the support. The shroud elements are plate-shaped bodies which form the shroud assembly by being laminated so as to be lined up in a circumferential direction of the support.

DESCRIPTION OF EMBODIMENTS

Hereinafter, embodiments will be described with reference to the drawings.

Embodiment 1

Figure 1:
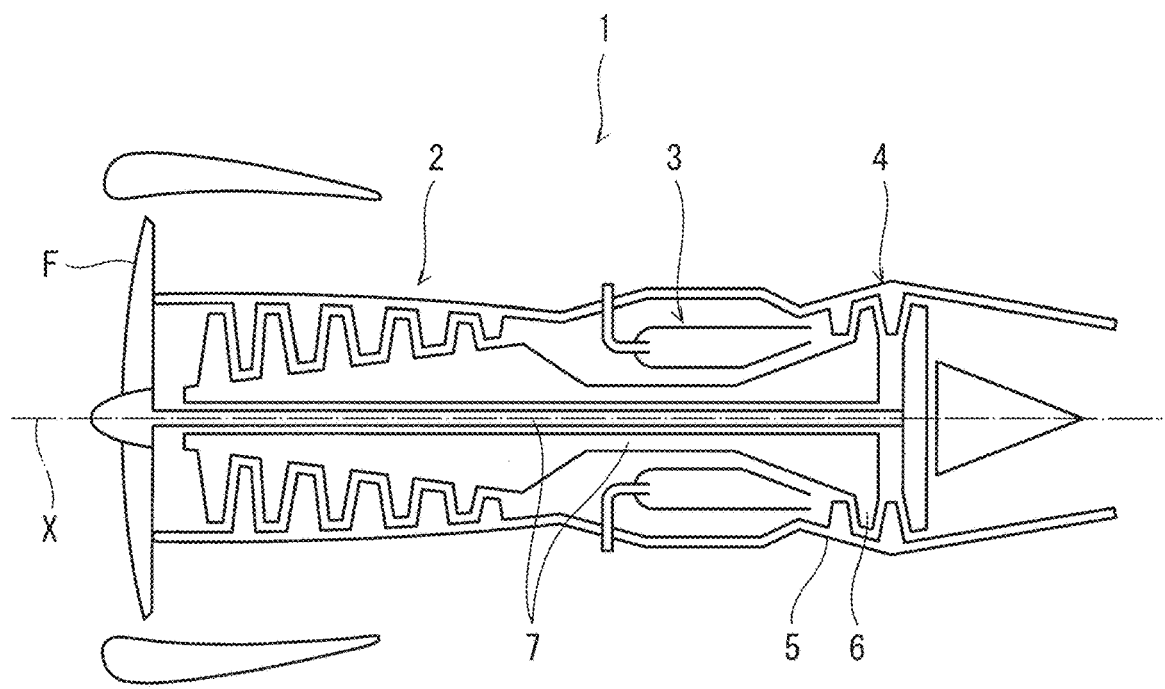
FIG. 1 is a schematic sectional view showing a gas turbine including a shroud attaching structure according to an exemplary embodiment.

FIG. 1 is a schematic sectional view showing a gas turbine 1 including a shroud attaching structure according to Embodiment 1. As shown in FIG. 1, in the gas turbine 1, air introduced outside is compressed in a compressor 2 and is then introduced to a combustor 3. A fuel is combusted in the combustor 3 together with the compressed air, and energy of the obtained high-temperature and high-pressure combustion gas is taken out as shaft torque (rotational power) in a turbine 4. The turbine 4 and the compressor 2 are coupled to each other through a rotating shaft 7, and the turbine 4 drives the compressor 2 (and a fan F). There are various types of gas turbines. For example, according to a turbo fan engine, a fan is driven mainly by power collected by a turbine, and an engine output is obtained as thrust. Such turbo fan engine is used as an aircraft engine. FIG. 1 shows the turbo fan engine that is one example of the gas turbine. However, the present disclosure is not limited to this. A below-described heat-resistant shroud assembly 12 (see FIG. 2) is provided at the turbine 4. The shroud assembly 12 (see FIG. 2) is provided at an inner peripheral surface side of a cylindrical casing 5 of the turbine 4 and is opposed to a radially outer tip end of a moving blade 6.

Figure 2:
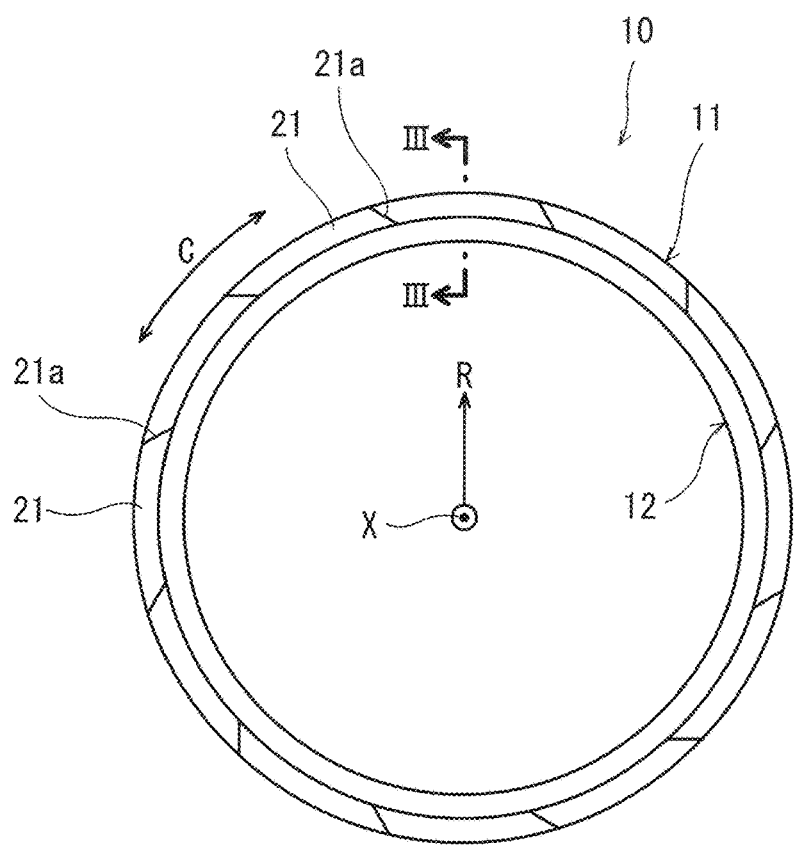
FIG. 2 is a front view showing the shroud attaching structure provided at the gas turbine of FIG. 1 when viewed in an axial direction.

FIG. 2 is a front view showing a shroud attaching structure 10 provided at the gas turbine engine 1 of FIG. 1 when viewed in an axial direction. As shown in FIG. 2, the shroud attaching structure 10 includes a support 11 and the shroud assembly 12. The support 11 is provided at an inner peripheral surface side of a portion of the casing 5 (see FIG. 1) which portion is opposed to the moving blade 6. The shroud assembly 12 is attached to an inner peripheral surface side of the support 11. The entire support 11 has an annular shape along the inner peripheral surface of the casing 5. The support 11 is formed separately from the casing 5. However, the support 11 may be formed integrally with the casing 5. The support 11 is constituted by a plurality of support blocks 21 lined up in a circumferential direction C of the support 11 so as to be displaceable in a radial direction R of the support 11. It should be noted that the support 11 is not limited to the combination of the plurality of support blocks 21 and may be formed by a single member.

The gas turbine 1 has an active clearance control function of controlling a tip clearance of the moving blade 6. There are various types of active clearance control functions. For example, the active clearance control function can be realized in such a manner that the casing 5 is forcibly contracted by spraying cooling air to an outer periphery of the casing 5 while the gas turbine 1 is driving. The support blocks 21 are displaced in the radial direction R in association with a change in the diameter of the casing 5, and with this, a change in the diameter of the support 11 occurs so as to follow the change in the diameter of the casing 5. It should be noted that the gas turbine 1 may not have the active clearance control function. Each of the support blocks 21 has a substantially circular-arc shape. End surfaces 21a, facing in the circumferential direction C, of the support blocks 21 are inclined relative to the radial direction R when viewed in an axial direction X (see FIG. 1) of the gas turbine engine 1. It should be noted that the end surfaces 21a, facing in the circumferential direction C, of the support blocks 21 do not have to be inclined relative to the radial direction R.

Figure 3:
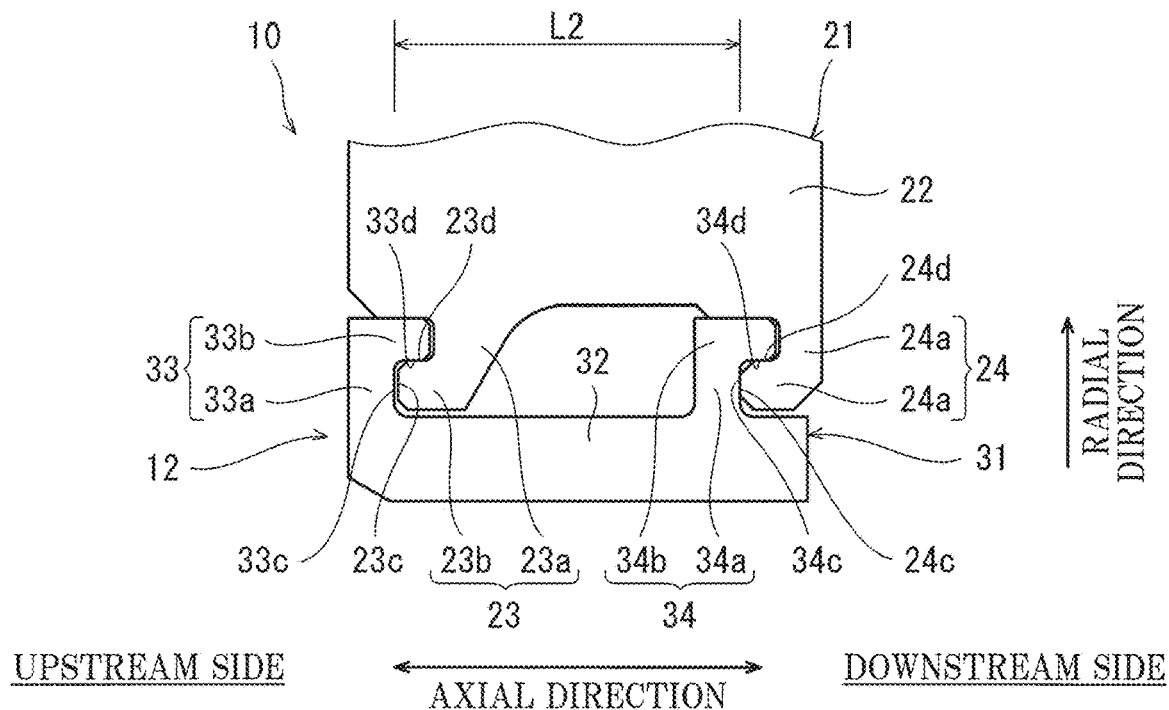
FIG. 3 is a sectional view taken along line of FIG. 2.
Figure 4:
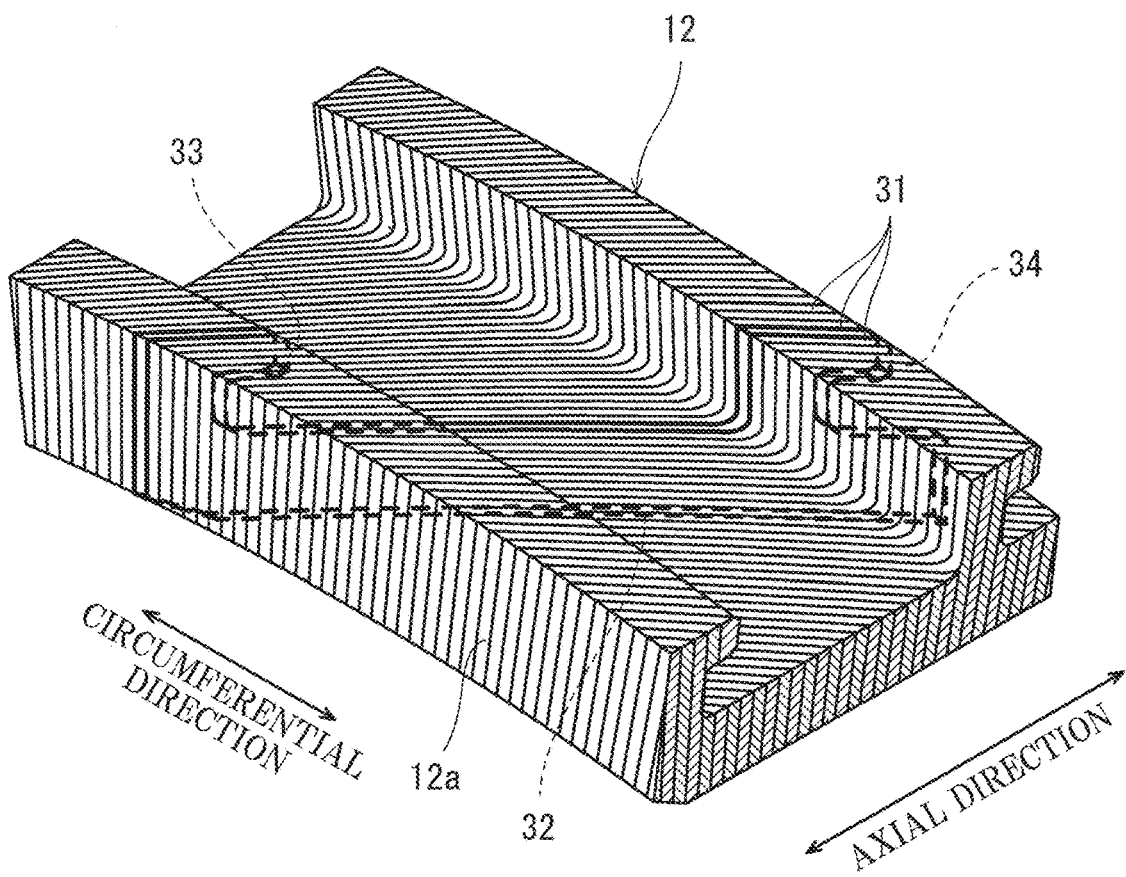
FIG. 4 is a sectional perspective view showing a shroud assembly shown in FIG. 3.
Figure 5:
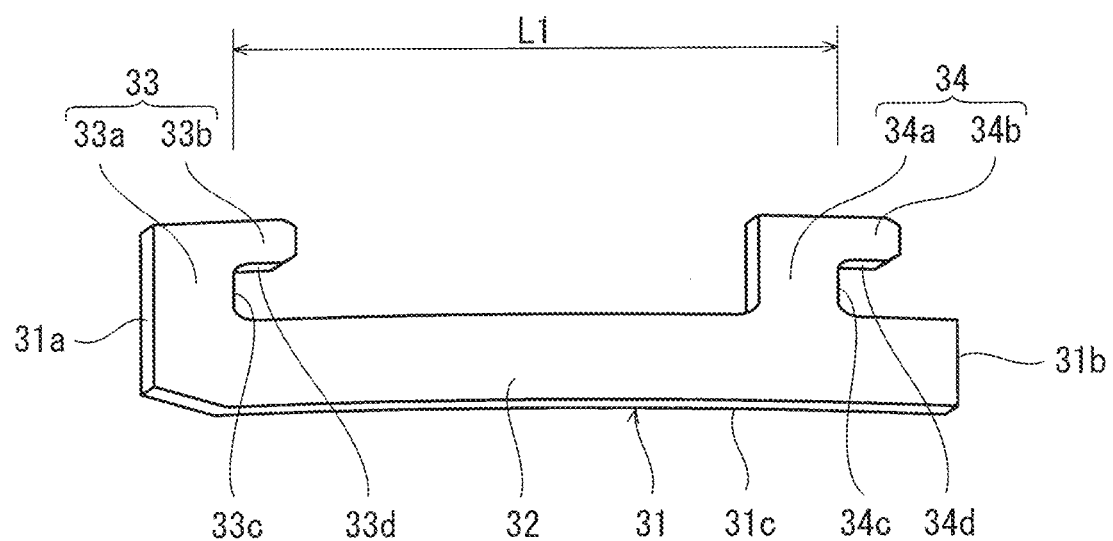
FIG. 5 is a perspective view showing a shroud element constituting the shroud assembly shown in FIG. 4.

FIG. 3 is a sectional view taken along line of FIG. 2. FIG. 4 is a sectional perspective view showing the shroud assembly 12 shown in FIG. 3. FIG. 5 is a perspective view showing a shroud element 31 constituting the shroud assembly 12 shown in FIG. 4. As shown in FIGS. 3 to 5, the shroud assembly 12 is formed such that a large number of shroud elements 31 made of a ceramic matrix composite (CMC) and each having a thin plate shape are lined up in the circumferential direction C and laminated so as to be in surface contact with each other. To be specific, the plurality of thin-plate shroud elements 31 are laminated on each other such that a thickness direction of each shroud element 31 contains a component directed in the circumferential direction C of the shroud assembly 12 extending in a circular-arc shape. For example, it is preferred that the shroud elements 31 are to be laminated on each other such that the thickness direction of each shroud element 31 is inclined relative to the circumferential direction C of the shroud assembly 12 at an angle of 0° or more and 60° or less, preferably 0° or more and 45° or less, further preferably 5° or more and 45° or less. The thickness of the shroud element 31 in the circumferential direction C is smaller than the size of a below-described main body portion 22 in the radial direction R. The shroud element 31 has a thin plate shape. Therefore, even when the shroud element 31 is made of the ceramic matrix composite having a long fiber shape, manufacturability is excellent. The ceramic matrix composite is prepared by, for example, impregnating silicon carbide fiber with ceramic matrix.

The shroud assembly 12 is formed in an annular shape (endless closed loop shape) over the whole circumference in the circumferential direction C but may be partially provided so as to form a part in the circumferential direction C. When the shroud assembly 12 is formed in an annular shape over the whole circumference in the circumferential direction C without any gap, it is advantageous in that a biasing mechanism configured to bias an end edge, facing in the circumferential direction C, of the shroud assembly in such a direction that the shroud elements 31 are pressed against each other as below becomes unnecessary; and a terminal treatment of the shroud assembly can be omitted.

Each of the support blocks 21 includes the main body portion 22 and at least one engaged portion (23, 24) provided at an inside of the main body portion 22 in the radial direction R. To be specific, the number of engaged portions may be one or plural. As one example, the support block 21 of the present embodiment includes a pair of engaged portions 23 and 24. The pair of engaged portions 23 and 24 are located away from each other in the axial direction X. The engaged portions 23 and 24 respectively include second engaged end surfaces 23d and 24d facing outward in the radial direction R. The engaged portion 24 includes an axial positioning end surface 24c facing an upstream side in the axial direction X. The engaged portion 23 includes an end surface 23c facing the upstream side in the axial direction. However, the end surface 23c may or may not support a below-described engaging portion 33.

Each of the engaged portions 23 and 24 is formed in a hook shape. Claws of the hook-shaped engaged portions 23 and 24 may be directed toward an upstream side of the turbine or a downstream side of the turbine. Specifically, the engaged portion 23 includes: a root portion 23a projecting from the main body portion 22 outward in the radial direction R; and a claw portion 23b projecting from a tip end side of the root portion 23a toward the upstream side of the gas turbine, and the engaged portion 24 includes: a root portion 24a projecting from the main body portion 22 outward in the radial direction R; and a claw portion 24b projecting from a tip end side of the root portion 24a toward the upstream side of the gas turbine. The axial positioning end surface 24c is an end surface, facing the upstream side of the gas turbine, of the root portion 23a. The engaged end surfaces 23d and 24d are end surfaces of the claw portions 23b which surfaces face outward in the radial direction R. It should be noted that each of the engaged portions 23 and 24 of the support block 21 is formed continuously over the shroud elements 31 in the circumferential direction C but may be formed non-continuously.

The shroud elements 31 are positioned by at least two types of support which are support by the support blocks 21 in the radial direction and support by the support blocks 21 from the downstream side toward the upstream side. Each of the shroud elements 31 includes: a main body portion 32 having a long plate shape; and at least one engaging portion (33, 34) projecting from a long side of the main body portion 32. To be specific, the number of engaging portions may be one or plural. As one example, the shroud element 31 of the present embodiment includes a pair of engaging portions 33 and 34. The main body portion 32 and the engaging portions 33 and 34 are formed on the same plane. The shroud element 31 is a substantially flat plate as a whole. In the present embodiment, since the shroud element 31 has a shape obtained by dividing the ring-shaped shroud assembly 21 in the circumferential direction, the shroud element 31 has a wedge section that gradually increases in thickness from an inside toward an outside in the radial direction R. It should be noted that the shroud element 31 can optionally have the wedge section. For example, the thickness of the shroud element 31 may be constant, or the change in the thickness of the shroud element 31 may be suitably determined in accordance with various requirements of design. An average thickness of the shroud element 31 is, for example, 0.1 to 5 mm, preferably 0.2 to 3 mm.

The main body portion 32 is arranged inside the support 11 in the radial direction R and extends in the axial direction X. The pair of engaging portions 33 and 34 are provided at a side of the main body portion 32 which side is opposed to the support block 21. The engaging portions 33 and 34 respectively engage with the engaged portions 23 and 24 of the support block 21. The pair of engaging portions 33 and 34 respectively include engaging end surfaces 33d and 34d facing outward in the radial direction R. The engaging portion 34 includes an axial positioning end surface 34c facing the downstream side in the axial direction X. The engaging portion 33 includes an end surface 33c facing the downstream side in the axial direction, but the end surface 33c may be or may not be supported by the engaged portion 23.

Each of the engaging portions 33 and 34 has a hook shape. Claws of the hook-shaped engaging portions 33 and 34 may be directed toward the upstream side or downstream side of the turbine. Specifically, the engaging portion 33 includes: a root portion 33a projecting from the main body portion 32 outward in the radial direction R; and a claw portion 33b projecting from a tip end side of the root portion 33a toward the downstream side of the gas turbine, and the engaging portion 34 includes: a root portion 34a projecting from the main body portion 32 outward in the radial direction R; and a claw portion 34b projecting from a tip end side of the root portion 34a toward the downstream side of the gas turbine. The axial positioning surface 34c is an end surface, facing the downstream side of the gas turbine, of the root portion 33a. The engaging end surfaces 33d and 34d are respective end surfaces of the claw portions 33b which surfaces face inward in the radial direction R.

A distance L1 (see FIG. 5) between the pair of engaging portions 33 and 34 is longer than a distance L2 (see FIG. 3) between the pair of engaged portions 23 and 24. While the gas turbine 1 is not being driven, the shroud elements 31 are attached to the support 11 in such a manner that: the shroud elements 31 are parallel to or inclined relative to the axial direction X; and the engaging portions 33 are engaged with the engaged portions 23. The shroud elements 31 are slidable on each other. The shroud elements 31 are laminated on each other so as to be tiltable about the radial direction R. Each of the shroud elements 31 is also tiltable about a longitudinal direction of the main body portion 32. The shroud elements 31 are not restrained, i.e., are displaceable at one side in the axial direction X (i.e., at the upstream side in FIG. 3) and in the circumferential direction C.

According to this configuration, there are gaps among the shroud elements 31 in a stationary and assembled state. Even in this case, when gas pressure starts acting by the operation start of the gas turbine, the shroud elements 31 tilt so as to fill the gaps. Thus, the shroud elements 31 tightly contact each other and become stable and stationary. On this account, severe dimension adjustment (such as shim adjustment) during assembling is not required. Moreover, even when a thermal expansion difference is generated during driving, or even when a circumferential length of the support dynamically changes by active clearance control, the shroud elements 31 slide on each other, and this changes the inclinations of the shroud elements 31. Thus, the shroud elements 31 can flexibly follow such changes while stably maintaining a tight contact state. Moreover, for example, even when the support blocks 21 (casing 5) move, or even when relative size changes of the shroud elements 31 and peripheral members occur by the thermal expansion difference between the shroud elements 31 and the peripheral members, the shroud elements 31 can follow such movement or such size changes. Furthermore, when the support blocks 21 are displaced in the radial direction R by the active clearance control, and this causes the change in the diameter of the support 11, the adjacent shroud elements 31 slide on each other to tilt relative to the axial direction X. With this, the circumferential length of the shroud assembly 12 changes, and this causes the change in the diameter of the shroud assembly 12. Thus, the shroud assembly 12 can smoothly follow the change in the diameter of the support 11.

End surfaces 31a and 31b (see FIG. 5) of the shroud element 31 face in an extending direction of the main body portion 32 and are inclined relative to a virtual plane perpendicular to the extending direction. To be specific, the end surfaces 31a and 31b of the shroud elements 31 are inclined. Therefore, when the shroud elements 31 are attached to the support blocks 21 while being inclined relative to the axial direction X, an end surface 12a (see FIG. 4), facing in the axial direction X, of the shroud assembly 12 becomes a substantially flat surface. End surfaces 31c of the shroud elements 31 constitute a radially inner surface of the shroud assembly 12. The shape (direction, curvature, bending) of the end surface 31c is set such that the radially inner surface of the shroud assembly 12 has a shape (typically, a cylindrical shape, a conical shape, or a combination thereof) preferred during a typical operating state of the turbine.

According to the above-described exemplary configuration, the shroud assembly 12 is formed by laminating the plate-shaped shroud elements 31 such that the thickness direction of the shroud element 31 corresponds to the circumferential direction C of the support 11. Therefore, each of the shroud elements 31 has a simple plate shape and can be easily produced. Especially, it is difficult for the ceramic matrix composite (CMC) to form a thick three-dimensional shape. However, according to the present configuration, it is preferable for the shroud element 31 to be formed in a thin plate shape. Therefore, the shroud can be easily produced by the ceramic matrix composite.

The shroud assembly 12 is divided into a large number of shroud elements 31. Therefore, even if a crack is generated on one shroud element 31 due to some abnormality, the crack of the shroud element 31 is prevented from spreading to the adjacent shroud elements 31. Thus, the function of the shroud can be maintained even after the generation of the crack.

In addition, since the shroud elements 31 laminated on each other in the circumferential direction C are slidable on each other, the shape of the shroud assembly 12 can be flexibly changed. Therefore, excessive stress is prevented from being applied to the shroud elements 31.

The axial positioning end surface 34c of the engaging portion 34 faces toward the downstream side of the turbine. While the gas turbine engine 1 is driving, the engaging portion 34 is naturally pushed toward the engaged portion 24 by the high-pressure gas at the upstream side of the turbine, and this generates load which increases inclination angles of the shroud elements 31 in the axial direction. Therefore, even when the laminated state of the shroud assembly 12 is disordered during the driving of the turbine, there is an effect in which the inclination angles of the shroud elements 31 in the axial direction naturally recover, i.e., try to become maximum. Thus, the engagement of the shroud elements 31 with the support blocks 21 is maintained. Moreover, the generation of the gaps among the shroud elements 31 can also be prevented.

While the gas turbine engine 1 is driving, the thermal expansion difference may be generated between the shroud element 31 and the support 21. In the present embodiment, the adjacent shroud elements 31 slide on each other, and the shroud elements 31 are tiltable relative to the axial direction X. Therefore, the relative size change caused by the thermal expansion difference is absorbed, and the gap between the adjacent shroud elements 31 is prevented from being generated. It should be noted that if the moving blade 6 contacts the shroud elements 31, the shroud elements 31 can tilt and escape in the radial direction R.

Moreover, appropriate gaps need to be provided among the support blocks 21 so as to be able to absorb the thermal expansion difference between the support block 21 and the casing 5 and the change in the circumferential length by the active clearance control. However, the positions and postures of the shroud elements 31 arranged in the vicinity of peripheral ends of the support blocks 21 need to be set so as not to be influenced by the gaps. In the present embodiment, the end surfaces 21a, facing in the circumferential direction C, of the plurality of support blocks 21 are inclined relative to the radial direction R (see FIG. 2). Therefore, the shroud element 31 located in the vicinity of the end surfaces 21a of the support blocks 21 hardly gets into the gap between the adjacent support blocks 21. Thus, the shroud element 31 is prevented from being unexpectedly hooked to the gap.

Embodiment 2

Figure 6:
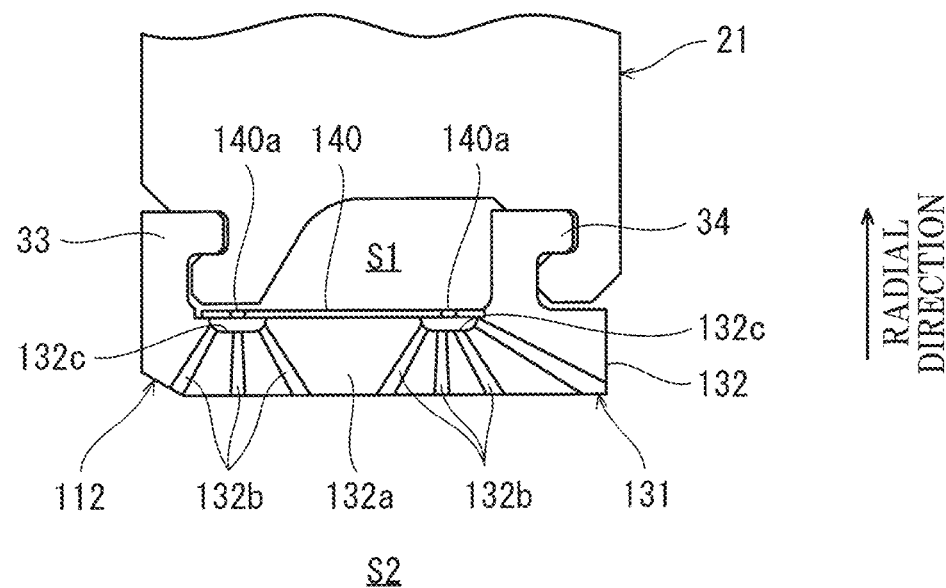
FIG. 6 is a diagram for explaining the shroud element according to an exemplary embodiment and corresponds to FIG. 3.

FIG. 6 is a diagram for explaining a shroud element 131 according to Embodiment 2 and corresponds to FIG. 3. The same reference signs are used for the same components as in Embodiment 1, and a repetition of the same explanation is avoided. As shown in FIG. 6, the shroud element 131 constituting a shroud assembly 112 includes: a main body portion 132 having a long plate shape; and the pair of engaging portions 33 and 34 projecting from the main body portion 132. The outer shape of the shroud element 131 of Embodiment 2 is substantially the same as the outer shape of the shroud element 31 of Embodiment 1 but is not limited to this.

Grooves 132b extending from an outside to an inside in the radial direction R are formed on a main surface 132a of the main body portion 132 of the shroud element 131, the main surface 132a facing in the circumferential direction. The grooves 132b continuously extend from a radial-direction-R outside end edge of the main body portion 132 to a radial-direction-R inside end edge of the main body portion 132 and are open at both sides in the radial direction R. Therefore, when a plurality of shroud elements 131 are laminated on each other, the grooves 132b of each shroud element 131 are closed by the adjacent shroud element 131 in the circumferential direction C to form cooling holes through which a space outside the main body portion 132 in the radial direction R communicates with a space inside the main body portion 132 in the radial direction R. It should be noted that the grooves 132b may be formed on one of the surfaces of the shroud element 131 or may be formed on both surfaces of the shroud element 131.

A ring-shaped cover 140 that is concentric with the shroud assembly 112 is provided at the radial-direction-R outside end edges of the main body portions 132 of the shroud assembly 112. The cover 140 covers the main body portions 132 entirely in the longitudinal direction. At least one depressed portion 132c (in FIG. 6, two depressed portions 132c) is formed on the radial-direction-R outside end edges of the main body portions 132. The grooves 132b communicate with the depressed portions 132c. Through holes 140a are formed on portions of the cover 140 which portions face the depressed portions 132c. Cooling gas is supplied to a cooling gas space S1 formed between an inner peripheral surface of the support 11 and an outer peripheral surface of the cover 140. It should be noted that the through hole 140a is not limited to a circular hole and may be, for example, a slit.

According to this configuration, the cooling gas supplied to the space S1 flows through the through holes 140a, the depressed portions 132c, and the grooves 132b to a space S2 located inside the shroud assembly 112 in the radial direction R. Therefore, the shroud elements 131 are suitably cooled. Moreover, since the cover 140 is provided, the cooling gas in the space S1 is prevented from leaking through minute gaps (portions other than the grooves 132b) each between the adjacent shroud elements 131. Thus, a designed cooling effect can be obtained. It should be noted that since the other components are the same as those in Embodiment 1, explanations thereof are omitted, but the other components are not limited to those in Embodiment 1.

Embodiment 3

Figure 7A:
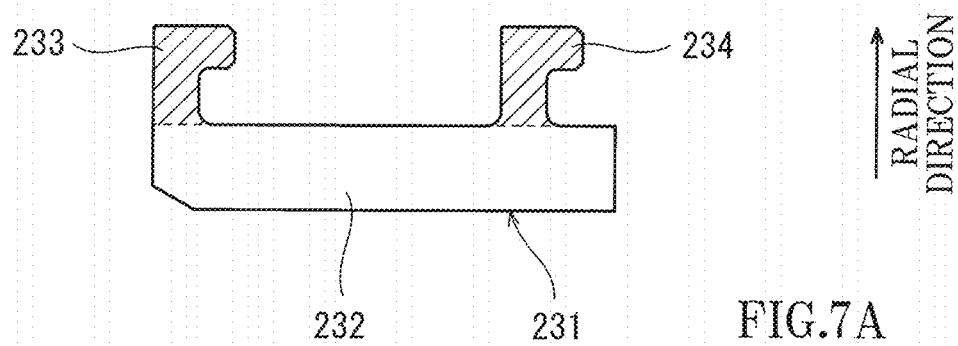
FIG. 7A is a plan view showing the shroud element according to an exemplary embodiment.
Figure 7B:
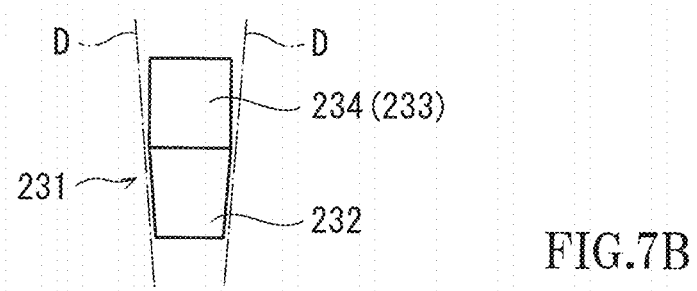
FIG. 7B is an end view showing the shroud element according to an exemplary embodiment when viewed in the axial direction.

FIG. 7A is a plan view showing a shroud element 231 according to Embodiment 3. FIG. 7B is an end view showing the shroud element 231 when viewed in the axial direction. The same reference signs are used for the same components as in Embodiment 1, and a repetition of the same explanation is avoided. As shown in FIG. 7, the shroud element 231 includes: a main body portion 232 having a long plate shape; and a pair of engaging portions 233 and 234 projecting from the main body portion 232. The outer shape of the shroud element 231 of Embodiment 3 is substantially the same as the outer shape of the shroud element 31 of Embodiment 1 but is not limited to this.

Generally speaking, when a ring shape is equally divided at regular intervals in a circumferential direction, intervals each between virtual divided surfaces D in the circumferential direction gradually widen from a radially inner side toward a radially outer side when viewed in an axial direction of the ring shape. To be specific, each of the divided parts obtained by equally dividing the ring shape in the circumferential direction has a wedge shape when viewed in the axial direction of the ring shape. On the other hand, in the shroud element 231 of the present embodiment, surfaces of the engaging portion 234 are inclined so as to be away from corresponding virtual divided surfaces D passing through corresponding outermost points of the shroud element 231 in the circumferential direction C. To be specific, a distance between the engaging portion 234 and the virtual divided surface D is longer than a distance between the main body portion 232 and the virtual divided surface D.

According to this configuration, even when lamination angles of the shroud elements 231 change, changes in contact positions of the shroud elements 231 are suppressed. Thus, sliding resistance can be stabilized, and slide amounts of the shroud elements 231 lined up in the circumferential direction C can be prevented from varying. Moreover, since the adjacent shroud elements 231 contact each other at the main body portions 232, a shearing load generated at the engaging portions 233 and 234 can be suppressed. Furthermore, since a portion of the shroud element 231 which portion is located closest to the virtual divided surface D extends entirely in the longitudinal direction of the shroud element 231, the adjacent shroud elements 231 stably contact each other entirely in the longitudinal direction. On this account, when introducing the cooling gas from the radially outer side, a seal effect of preventing the cooling gas from passing through between the adjacent shroud elements 231 is achieved. Thus, the cooling gas is easily controlled. It should be noted that since the other components are the same as those in Embodiment 1, explanations thereof are omitted, but the other components are not limited to those in Embodiment 1.

Embodiment 4

Figure 8A:
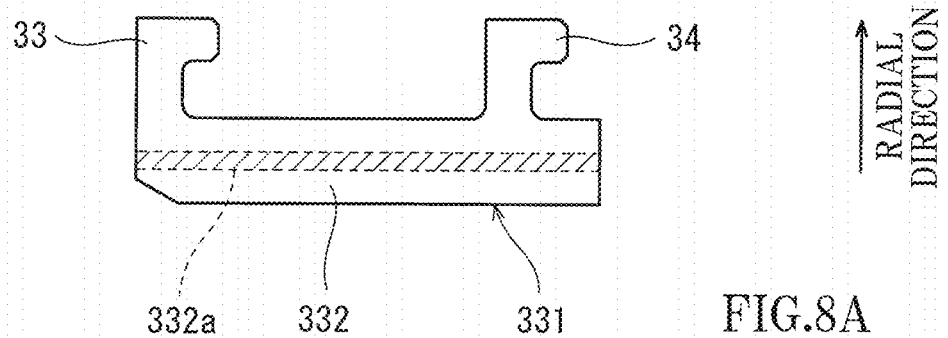
FIG. 8A is a plan view showing the shroud element according to an exemplary embodiment.
Figure 8B:
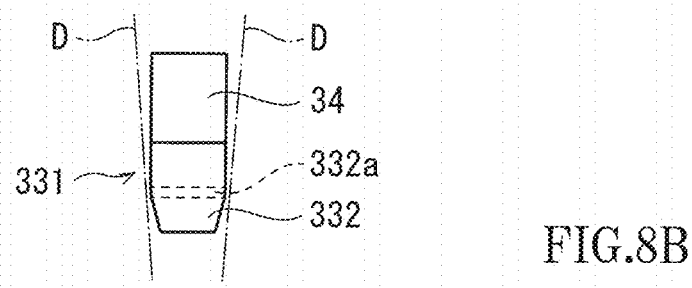
FIG. 8B is an end view showing the shroud element according to an exemplary embodiment when viewed in the axial direction.

FIG. 8A is a plan view showing a shroud element 331 according to Embodiment 4. FIG. 8B is an end view showing the shroud element 331 when viewed in the axial direction. The same reference signs are used for the same components as in Embodiment 1, and a repetition of the same explanation is avoided. As shown in FIG. 8, the shroud element 331 includes: a main body portion 332 having a long plate shape; and the pair of engaging portions 33 and 34 projecting from the main body portion 332. To be specific, the outer shape of the shroud element 331 of Embodiment 4 is substantially the same as the outer shape of the shroud element 31 of Embodiment 1. The main body portion 332 of the shroud element 331 includes a portion 332a which is located closest to the virtual divided surfaces D passing through the corresponding outermost points in the circumferential direction C. Portions of the shroud element 331 other than the portion 332a are inclined so as to be away from the virtual divided surfaces D. To be specific, a distance between the portion 232a and the virtual divided surface D is larger than a distance between the other portion and the virtual divided surface D.

According to this configuration, even when lamination angles of the shroud elements 331 change, changes in contact positions of the shroud elements 331 are suppressed. Thus, sliding resistance can be stabilized, and slide amounts of the shroud elements 331 lined up in the circumferential direction C can be prevented from varying. Moreover, since the thick portion 332a of the shroud element 331 that changes in thickness in the radial direction R is provided at not the engaging portions 33 and 34 but the main body portion 332, the shearing load generated at the engaging portions 33 and 34 can be suppressed. Furthermore, since the portion 332a of the shroud element 331 which portion is located closest to the virtual divided surfaces D extends entirely in the longitudinal direction, the adjacent shroud elements 331 stably contact each other at the portions 332a entirely in the longitudinal direction. On this account, when introducing the cooling gas from the radially outer side, a seal effect of preventing the cooling gas from passing through between the adjacent shroud elements 331 is achieved. Thus, the cooling gas is easily controlled. It should be noted that since the other components are the same as those in Embodiment 1, explanations thereof are omitted, but the other components are not limited to those in Embodiment 1.

Embodiment 5

Figure 9:
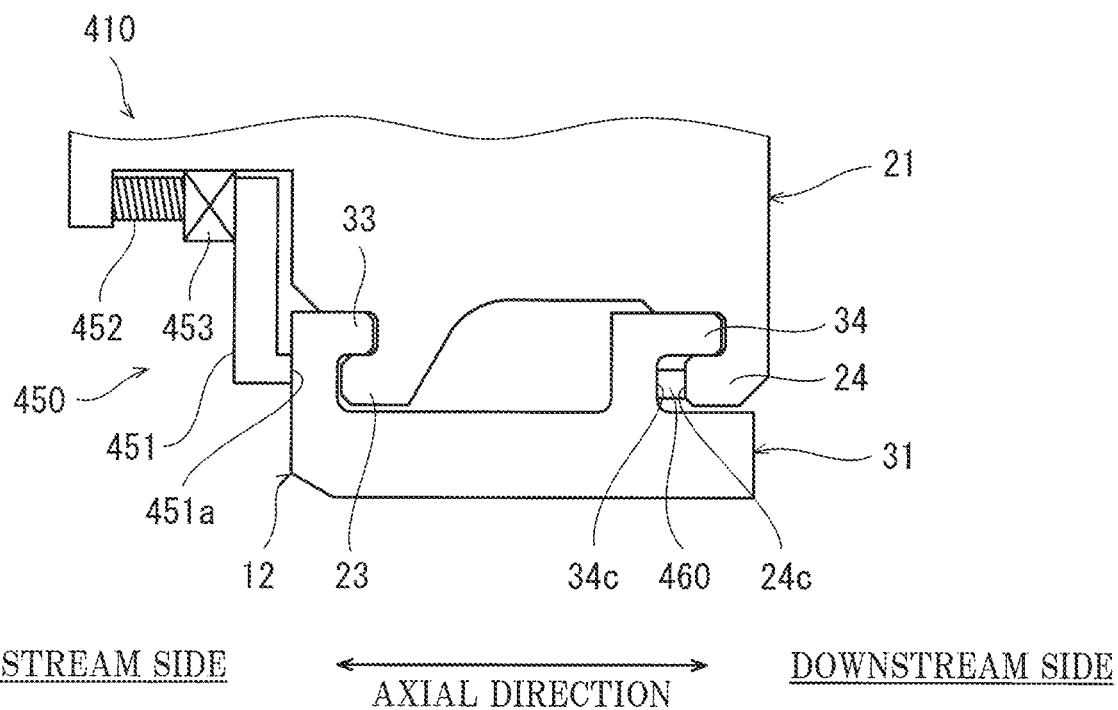
FIG. 9 is a diagram showing the shroud attaching structure according to an exemplary embodiment and corresponds to FIG. 3.
Figure 10:
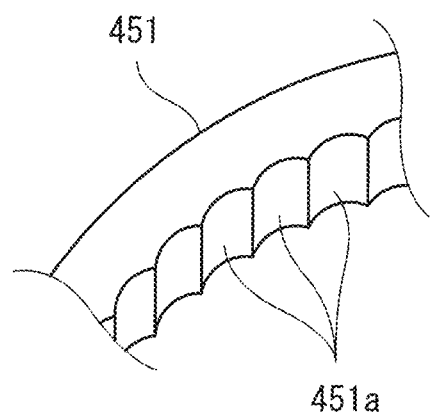
FIG. 10 is a perspective view showing part of a flange of FIG. 9.

FIG. 9 is a diagram showing a shroud attaching structure 410 according to Embodiment 5 and corresponds to FIG. 3. FIG. 10 is a perspective view showing part of a contact member 451 shown in FIG. 9. The same reference signs are used for the same components as in Embodiment 1, and a repetition of the same explanation is avoided. As shown in FIG. 9, the support block 21 and the shroud assembly 12 are the same as those in Embodiment 1. The shroud attaching structure 410 includes a preload mechanism 450 configured to apply a preload to the shroud assembly 12 in the axial direction X. The preload mechanism 450 applies the preload to the shroud assembly 12 in such a direction that the axial positioning end surface 34c of the shroud element 31 receives from the axial positioning end surface 24c of the support block 21 reaction acting toward the upstream side of the turbine. To be specific, the preload mechanism 450 elastically pushes a turbine upstream side end surface of the shroud assembly 12 in the axial direction X.

Specifically, the preload mechanism 450 includes the contact member 451, a pushing member 452, and a thrust bearing 453. The contact member 451 pushes the shroud assembly 12 from the upstream side of the turbine. The pushing member 452 is supported by the support block 21 and biases the contact member 451 toward the downstream side of the turbine. The thrust bearing 453 is interposed between the contact member 451 and the pushing member 452. As one example, the contact member 451 may be a flange. The pushing member 452 may be a spring or an actuator capable of adjusting pushing force. The contact member 451 is rotatable relative to the support block 21 about the axial direction X by the presence of the thrust bearing 453.

It is preferable that positioning grooves 451a be formed on a surface of the contact member 451 which surface pushes the turbine upstream side end surface of the shroud assembly 12, the positioning grooves 451a being arranged at regular intervals in the circumferential direction C at a pitch that is the same as an arrangement pitch of the shroud elements 31. To be specific, the turbine upstream side end surfaces of the shroud elements 31 are positioned by the positioning grooves 451a of the contact member 451. It is preferable that each of the positioning grooves 451a and the end surfaces of the shroud elements 31 have a substantially circular-arc shape when viewed in an extending direction of the positioning groove 451a. Moreover, a ring 460 is arranged between the engaging portion 34 and the engaged portion 24 at the downstream side of the turbine so as to be sandwiched between the engaging portion 34 and the engaged portion 24 in the axial direction X. It is preferable that positioning grooves (not shown) that are the same as the positioning grooves 451a be formed on a surface of the positioning ring 460 (positioning member) which surface pushes a turbine downstream side end surface of the shroud assembly 12, the positioning grooves being arranged at regular intervals in the circumferential direction C at a pitch that is the same as the arrangement pitch of the shroud elements 31. However, the positioning grooves do not have to be formed on the surface of the positioning ring 460.

The shroud assembly 12 is pushed by the preload mechanism 450 toward the downstream side relative to the support blocks 21. Therefore, even when the gas pressure is low in the turbine, a compressive load is applied in the axial direction to a large number of laminated shroud elements 31. With this, contact surface pressure which increases the inclinations of the shroud elements 31 is generated, and therefore, the shroud elements 31 tightly contact each other without gaps.

Moreover, even when the positions of the support blocks 21 change, the support blocks 21 and the ring 460 slide on each other, and therefore, force generated by the movements of the support blocks 21 is not directly transmitted to the shroud elements 31. Thus, when the shroud elements 31 tilt, the inclination angles of the shroud elements 31 are prevented from varying in the entire shroud assembly 12. A relative positional relation among the plurality of shroud elements 31 in the circumferential direction C can be kept constant by the positioning grooves 451a of the contact member 451 and the positioning grooves of the ring 460. Moreover, since the thrust bearing 453 is provided at the contact member 451, each shroud element 31 can smoothly tilt by using as a fulcrum a contact point with the positioning ring 460. It should be noted that since the other components are the same as those in Embodiment 1, explanations thereof are omitted, but the other components are not limited to those in Embodiment 1.

Embodiment 6

Figure 11:
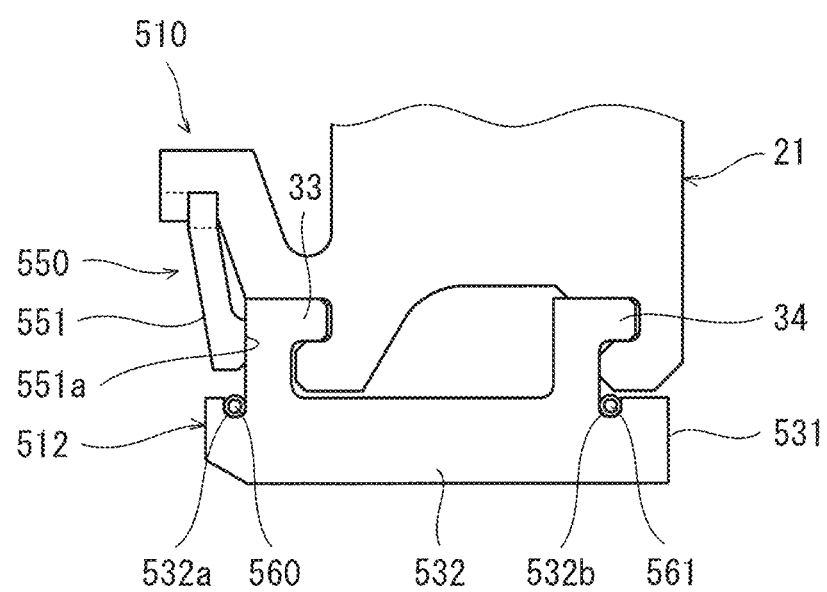
FIG. 11 is a diagram showing the shroud attaching structure according to an exemplary embodiment and corresponds to FIG. 3.

FIG. 11 is a diagram showing a shroud attaching structure 510 according to Embodiment 6 and corresponds to FIG. 3. The same reference signs are used for the same components as in Embodiment 1, and a repetition of the same explanation is avoided. As shown in FIG. 11, the support blocks 21 are the same as those in Embodiment 1. Shroud elements 531 constituting a shroud assembly 512 are substantially the same as the shroud elements 31 of Embodiment 1. The shroud attaching structure 510 includes a preload mechanism 550 configured to apply a preload to the shroud assembly 512 in the axial direction X.

The preload mechanism 550 applies a preload to the shroud assembly 12 in a direction toward the downstream side of the turbine. The preload mechanism 550 includes an elastic contact member 551. For example, the elastic contact member 551 is a flange having a disc spring shape. A radially outer end portion of the flange 551 is supported by the support block 21, and a radially inner end portion of the flange 551 elastically pushes a turbine upstream side end surface of the shroud assembly 512 in the axial direction X.

Recesses 532a and 532b are formed on a radially outer end surface of a main body portion 532 of the shroud element 531 so as to be respectively located outside the engaging portions 33 and 34 in the axial direction X. Positioning rings 560 and 561 (positioning members) are fitted in the recesses 532a and 532b without inhibiting angular changes of the shroud elements 531. Moreover, it is preferable that the positioning rings 560 and 561 be made of a material (such as an elastic material) having such flexibility as to smoothly follow the change in the circumferential length of the shroud assembly. With this, the pitch of the shroud elements 531 in the circumferential direction is restricted, and therefore, when the shroud elements 31 tilt, the inclination angles of the shroud elements 531 can be prevented from varying in the entire shroud assembly 12. It should be noted that since the other components are the same as those in Embodiment 1, explanations thereof are omitted, but the other components are not limited to those in Embodiment 1.

Embodiment 7

Figure 12A:
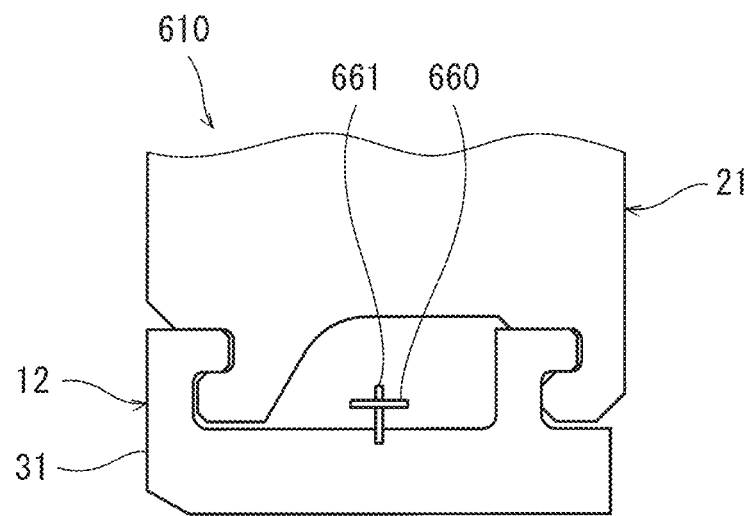
FIG. 12A is a diagram showing the shroud attaching structure according to an exemplary embodiment and corresponds to FIG. 3.
Figure 12B:
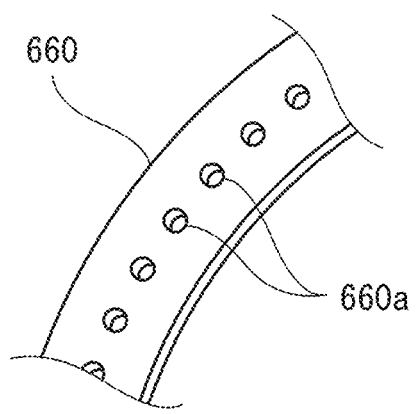
FIG. 12B is a perspective view showing part of a positioning ring shown in FIG. 12A.

FIG. 12A is a diagram showing a shroud attaching structure 610 according to Embodiment 7 and corresponds to FIG. 3. FIG. 12B is a perspective view showing part of a positioning ring 660 shown in FIG. 12A. The same reference signs are used for the same components as in Embodiment 1, and a repetition of the same explanation is avoided. As shown in FIGS. 12A and 12B, the support blocks 21 and the shroud assembly 12 are the same as those in Embodiment 1. The shroud attaching structure 610 includes the positioning ring 660 (positioning member) arranged outside the shroud assembly 12 in the radial direction and arranged concentrically with the shroud assembly 12.

A pin 661 projecting outward in the radial direction is provided at a middle of the shroud element 31 in the axial direction X. The positioning ring 660 includes positioning holes 660a lined up at regular intervals in the circumferential direction C. An arrangement pitch of the positioning holes 660a in the circumferential direction C is set such that with the pins 661 of the shroud elements 31 fitted in the positioning holes 660a, the shroud elements 31 are maintained to tightly contact each other and be laminated on each other. The shroud element 31 is arranged so as to be displaceable relative to the positioning ring 660 in the radial direction R. The positioning ring 660 does not restrict the displacement of the shroud element 31 in the radial direction. In the present embodiment, the pin 661 is directed in the radial direction. Therefore, when the shroud element 31 is displaced relative to the positioning ring 660 in the radial direction R, the pin 661 slides on the positioning hole 660a in the radial direction.

According to this configuration, since the pitch of the shroud elements 31 in the circumferential direction is restricted by the positioning ring 660, the positions of the shroud elements 31 in the circumferential direction can be prevented from varying. Moreover, since the pin 661 turns relative to the positioning hole 660a, the positioning ring 660 does not inhibit the tilting of the shroud element 31. It should be noted that since the other components are the same as those in Embodiment 1, explanations thereof are omitted, but the other components are not limited to those in Embodiment 1.

Embodiment 8

Figure 13:
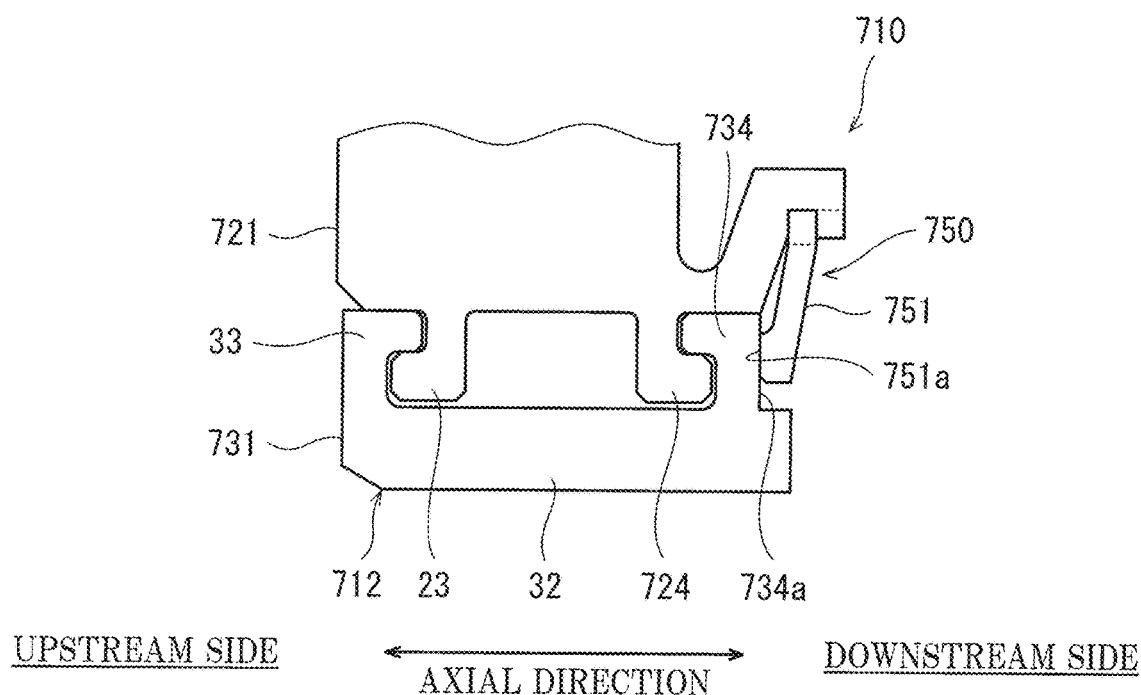
FIG. 13 is a diagram showing the shroud attaching structure according to an exemplary embodiment and corresponds to FIG. 3.

FIG. 13 is a diagram showing a shroud attaching structure 710 according to Embodiment 8 and corresponds to FIG. 3.

The same reference signs are used for the same components as in Embodiment 1, and a repetition of the same explanation is avoided. As shown in FIG. 13, the shroud attaching structure 710 of the present embodiment includes a support mechanism 750 configured to support a shroud assembly 712 toward the upstream side of the turbine in the axial direction X. In this case, one of a pair of engaging portions 33 and 734 (in FIG. 13, the engaging portion 734 at the downstream side) of each shroud element 731 constituting the shroud assembly 712 is engaged with an engaged portion 724 of a support block 721 toward the upstream side of the turbine. To be specific, the direction of the engaging portion 734 at the downstream side in the present embodiment is opposite in the axial direction X to that in Embodiment 1.

The support mechanism 750 includes a flange 751. A radially outer end portion of the flange 751 is supported by the support block 721. An axial positioning surface 751a of a radially inner end portion of the flange 751 supports an axial positioning end surface 734a located at the downstream side of the turbine in the shroud assembly 712, restricts the displacement of the shroud assembly 712 toward the downstream side, and receives a load generated at the shroud assembly 712 in the axial direction X during driving. Positioning grooves that are similar to those in FIG. 10 may or may not be formed on a surface of the flange 751 which surface contacts a turbine downstream side end surface of the shroud assembly 712. According to this configuration, heat input to the engaged portion 724 of the support block 721 is suppressed. Moreover, when the length of a gap in the axial direction X between the axial positioning surface 751a of the flange 751 and the engaged portion 724 of the support block 721 is appropriately set for the engaging portion 734 of the shroud element 731, a tilting range of the shroud element 731 can be limited such that the inclination angle of the shroud element 731 decreases. With this, the shroud assembly 712 can be stably held even at the time of stop without providing a complex preload mechanism. It should be noted that since the other components are the same as those in Embodiment 1, explanations thereof are omitted, but the other components are not limited to those in Embodiment 1.

Embodiment 9

Figure 14:
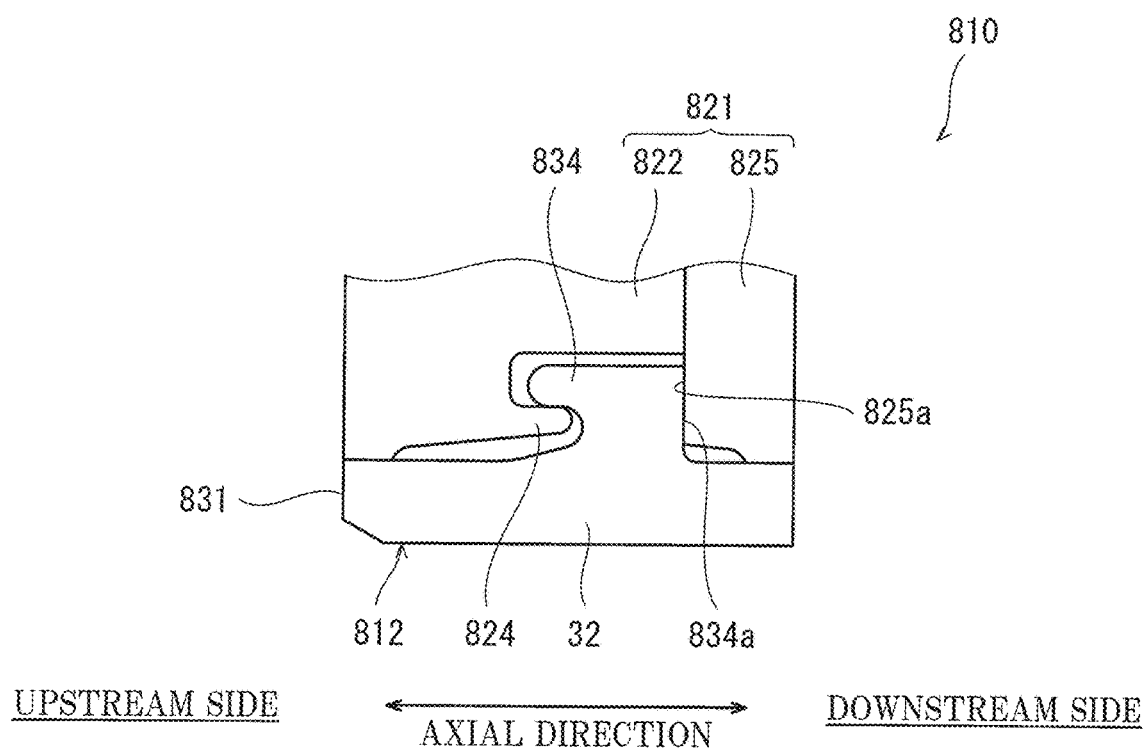
FIG. 14 is a diagram showing the shroud attaching structure according to an exemplary embodiment and corresponds to FIG. 3.

FIG. 14 is a diagram showing a shroud attaching structure 810 according to Embodiment 9 and corresponds to FIG. 3. The same reference signs are used for the same components as in Embodiment 1, and a repetition of the same explanation is avoided. As shown in FIG. 14, in the shroud attaching structure 810 of the present embodiment, only one engaged portion 824 is provided at each support block 821, and only one engaging portion 834 is provided at each shroud element 831 constituting a shroud assembly 812. The engaging portion 834 of the shroud element 831 is engaged with the engaged portion 824 of the support block 821 toward the upstream side of the turbine. The support block 821 includes a first member 822 and a second member 825. The first member 822 includes the engaged portion 824. The second member 825 supports a downstream portion of the engaging portion 834 of the shroud element 831 from the downstream side. The shroud element 831 includes an axial positioning end surface 834a facing the downstream side. The second member 825 includes an axial positioning end surface 825a facing the upstream side. The axial positioning end surface 834a of the shroud element 831 is positioned and supported by the axial positioning end surface 825a of the second member B25.

To be specific, the shroud element 831 is supported in at least two directions by engagement between the engaging portion 834 and the engaged portion 824 in the radial direction and support by the second member 825 from the downstream side of the engaging portion 834 toward the upstream side in the axial direction X. In the present embodiment, the displacement of the shroud element 831 toward the radially inner side is restricted by the engagement between the engaging portion 834 and the engaged portion 824. Moreover, the displacement of the shroud element 831 toward the radially outer side is restricted by the contact between the main body portion 32 and the support block 821. Specifically, the displacement of the shroud element 831 toward the radially outer side is restricted by the contact between a front portion of the main body portion 32 and the first member 822 and the contact between a rear portion of the main body portion 32 and the second member 825. Then, the postures of the shroud elements 831 are determined by the gas pressure acting from the upstream side toward the downstream side and the support by the support block 821 from the downstream side. To be specific, by the balance between the gas pressure acting from the upstream side toward the downstream side and the support by the second member 825 from the downstream side of the shroud element 831, the shroud elements 831 are inclined until the shroud elements 831 tightly contact each other. Thus, the postures of the shroud elements 831 are determined. Moreover, the direction of the engagement in the example shown in FIG. 14 may be reversed in an upstream-downstream direction. To be specific, the only one engaging portion provided at each shroud element may be engaged with the engaged portion of the support block toward the downstream side of the turbine, and the support block may include: the first member including the engaged portion; and the second member supporting the engaging portion of the shroud element from the upstream side. This configuration can provide a simple structure which can secure excellent productivity and assemblability and can prevent a case where the inclination angles of the shroud elements 831 decrease in a stationary state, and this causes disengagement. The present configuration is suitably applicable to a configuration in which a cooling structure is not provided. It should be noted that since the other components are the same as those in Embodiment 1, explanations thereof are omitted, but the other components are not limited to those in Embodiment 1.

The present disclosure is not limited to the above embodiments. Modifications, additions, and eliminations may be made with respect to the configurations of the embodiments. For example, some of components in one embodiment may be applied to the other embodiment. Some of components in an embodiment may be separated and arbitrarily extracted from the other components in the embodiment. The shroud element does not have to be inclined relative to the axial direction X and may be parallel to the axial direction X. The entire shroud element may be made of the ceramic matrix composite, or part of the shroud element may be made of the ceramic matrix composite. The preload mechanism may be configured to push both the upstream side end surface and downstream side end surface of the shroud assembly instead of pushing one of the upstream side end surface and downstream side end surface of the shroud assembly.

The present disclosure can provide a shroud of the gas turbine, the shroud being made of the ceramic matrix composite and being easily produced, and a crack being able to be prevented from spreading.

REFERENCE SIGNS LIST

1 gas turbine engine
4 turbine
5 casing
10, 410, 510, 610, 710, 810 shroud attaching structure
11 support
12, 112, 512, 712, 812 shroud assembly
21, 721, 821 support block
22, 332, 532 main body portion
23, 24, 724, 824 engaged portion
23*a*, 24*a* root portion
23*b*, 24*b* claw portion
24*c* axial positioning end surface
31, 131, 231, 331, 531, 731, 831 shroud element
32, 132, 332 main body portion
33, 34, 233, 234, 734, 834 engaging portion
33*a*, 34*a* root portion
33*b*, 34*b* claw portion
34*c*, 734*a*, 834*a* axial positioning end surface
132*a* main surface
132*b* groove
450, 550, 750 preload mechanism
451, 551, 751 flange
451*a* positioning groove
460, 560, 660 positioning ring (positioning member)

The invention claimed is:

1. A shroud attaching structure of a gas turbine, the shroud attaching structure comprising:
    a support provided around an axis of the gas turbine and inside a casing of the gas turbine in a radial direction; and
    a shroud assembly attached to the support so as to cover an inner peripheral surface of the support, the shroud assembly is formed by a large number of laminated shroud pieces containing a ceramic matrix composite,
    wherein each of the shroud pieces is entirely plate-shaped so that each of the shroud pieces is flat and straight,
    wherein the shroud pieces are lined up in a circumferential direction of the support such that a thickness direction of each of the shroud pieces corresponds to the circumferential direction, and
    wherein the adjacent shroud pieces are arranged so as to be slidable on each other.

2. The shroud attaching structure according to claim 1, wherein the shroud pieces are laminated in the circumferential direction such that thickness directions of the shroud pieces are inclined relative to an axial direction viewed from the radial direction.

3. The shroud attaching structure according to claim 2, wherein the shroud pieces are attached to the support so as to be tiltable in a direction inclined relative to at least one of the axial direction and the radial direction.

4. The shroud attaching structure according to claim 3, wherein the support includes an end surface that supports downstream portions of the shroud pieces from a downstream side.

5. The shroud attaching, structure according to claim 1, wherein each of the shroud pieces includes:
    a plate-shaped main body structure arranged inside the support in the radial direction; and
    at least one engaging structure provided at a side of the main body structure, the side of the main body is opposed to the support, and the at least one engaging structure is engaged with at least one engaged structure of the support.

6. The shroud attaching structure according to claim 5, wherein:
    the at least one engaged structure comprises a pair of engaged structures located away from each other in the axial direction;

the at least one engaging structure comprises a pair of engaging structures located away from each other in the axial direction; and a distance between the pair of engaging structures is longer than a distance between the pair of engaged structures.

7. The shroud attaching structure according to claim 6, wherein:

one of the pair of engaging structures includes an axial positioning end surface facing a downstream side of the gas turbine; and one of the pair of engaged structures includes an axial positioning end surface facing an upstream side of the gas turbine.

8. The shroud attaching structure according to claim 7, wherein each of the pair of engaging structures include:

a root structure projecting from the main body structure outward in the radial direction; and a claw projecting from a tip end side of the root structure in t axial direction.

9. The shroud attaching structure according to claim 1, further comprising a preloader to apply a preload to the shroud assembly in an axial direction, wherein the preloader applies the preload to the shroud assembly in a direction toward axial positioning surfaces of the shroud pieces, the direction is a direction that inclinations of the shroud pieces relative to the axial direction increase.

10. The shroud attaching structure according to claim 9, wherein the preloader includes a contact structure including positioning grooves lined up in the circumferential direction, the positioning grooves positioning axial-direction end structures of the shroud pieces.

11. The shroud attaching structure according to claim 1, wherein the support includes support blocks which are lined up in the circumferential direction so as to be displaceable in the radial direction of the support.

12. The shroud attaching structure according to claim 11, wherein circumferential-direction end surfaces of the support blocks are inclined relative to the radial direction.

13. The shroud attaching structure according to claim 5, wherein:

the main body structure and the at least one engaging structure are formed on a same plane; and each of the shroud pieces is a thin plate formed such that a thickness of the shroud piece in the circumferential direction is smaller than a size of the main body structure in the radial direction.

14. The shroud attaching structure according to claim 13, wherein a groove extending from an outside to an inside in the radial direction is formed on a main surface of the main body structure, and the main surface faces in the circumferential direction.

15. The shroud attaching structure according to claim 1, further comprising a ring-shaped cover arranged concentrically with the shroud assembly in an annular cooling gas space formed between the support and the shroud assembly, wherein the cover includes a through hole.

16. The shroud attaching structure according to claim 1, further comprising a positioning structure to determine a relative positional relation among the shroud pieces in the circumferential direction.

17. The shroud attaching structure according to claim 1, wherein the shroud pieces change in thickness in the radial direction.

18. A shroud assembly attached to a support provided inside a casing of a gas turbine in a radial direction, the shroud assembly comprising shroud pieces containing a ceramic matrix composite, wherein wherein each of the shroud pieces is entirely plate-shaped so that each of the shroud pieces is flat and straight, the plate-shaped shroud pieces are laminated so as to be lined up in a circumferential direction of the support such that a thickness direction of each of the shroud pieces corresponds to the circumferential direction, and the adjacent shroud pieces are arranged so as to be slidable on each other.

19. Shroud pieces of a gas turbine, the shroud pieces included in a shroud assembly attached to a support provided inside a casing of the gas turbine engine in a radial direction, adjacent shroud pieces are arranged so as to be slidable on each other, the shroud pieces contain a ceramic matrix composite, each of the shroud pieces comprising:

a plate-shaped main body structure arranged inside the support in the radial direction; and at least one engaging structure provided at a side of the main body structure, the side of the main body is opposed to the support, and the at least one engaging structure is engaged with an engaged structure of the support, wherein the shroud pieces are entirely plate-shaped bodies that are each flat and straight, and which form the shroud assembly by being laminated so as to be lined up in a circumferential direction of the support such that a thickness direction of each of the shroud pieces corresponds to the circumferential direction.

* * * * *